United States Patent Office 3,507,892
Patented Apr. 21, 1970

3,507,892
HEAVY METAL CHELATES OF AMINO HYDRAZIDE CHELATING AGENTS
Frederick C. Bersworth, East Orange, N.J., assignor to Weston Chemical Corporation, Morristown, N.J., a corporation of New Jersey
No Drawing. Filed Aug. 17, 1967, Ser. No. 661,204
Int. Cl. C07f *13/00, 1/08, 15/02*
U.S. Cl. 260—429                 8 Claims

ABSTRACT OF THE DISCLOSURE

Heavy metal chelates, iron, nickel, cobalt, manganese, magnesium, calcium, lead, barium, copper, aluminum, etc., reaction products of the metal ions with chelating agents which are the reaction products of hydrazine with synthetic poly-carboxylic amino acid compounds, characterized by the high stability of metal chelated per equivalent weight of the chelating agent, useful as sources of trace metals in agriculture.

RELATED APPLICATIONS

This application is a continuation-in-part of my prior application Ser. No. 580,829, filed Sept. 20, 1966, patented Nov. 7, 1967, under U.S. Patent No. 3,351,658, which is in turn a continuation of my earlier application Ser. No. 446,120, filed Apr. 6, 1965, now abandoned.

BACKGROUND OF THE INVENTION

The necessity for putting metals in a form in chemical compounds whereby the concentration of metal ion in a given milieu can be controlled is a continuing one and while many chemical tools are available for the purpose, the requirements extend beyond available chemical tools. Conventional chelating agents are characterized by a variety of limitations principally their ability to hold a metal over a wide range of pH of solution and also by the overall reactibility of a particular metal ion with a chelating agent. That is, quite often it is not possible to react a sufficient amount of a metal ion with a given chelating agent to justify the matter economically. Similarly, solubility limitations determine or limit usefulness of agents in other areas.

It is accordingly a fundamental object of the instant invention to provide a novel form of metal chelate which is characterized by its extreme versatility and its capacity for being stable in bound form, as chelate under a wide variety of pH conditions and, particularly, in the ratio generally of one mol of metal per mol of the chelating agent.

DETAILED DESCRIPTION OF THE INVENTION

The invention accordingly is embodied in a sequence of compositions of matter characterized by their being the metal chelates generally in a high molar ratio of metal ion to chelating agent, formed by the reaction of a heavy metal salt selected from the group consisting of iron (di- and trivalent), copper, nickel, cobalt (di- and trivalent), zinc, lead, calcium, magnesium, chromium, aluminum, tin, and manganese with a chelating agent defined by the following, wherein M represents the heavy metal and X the chelating moiety:

$$M_a \cdot X$$

wherein $a$ is 1 to 2 inclusive and X is defined as follows:

The reaction product of a compound having a formula given by:

wherein,
R is

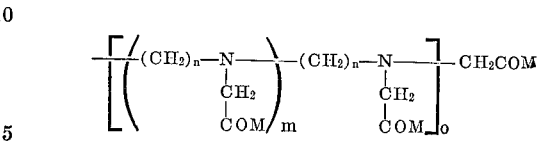

$m = 0-4$
$o = 0, 1$
$n = 2, 3$ and —COM is independently selected from the group consisting of COOH, —COONa, —COOK, —COONH$_4$, and C—O—O—alkyl, not more than two COM's being —CH$_2$OH, with a compound selected from the group consisting of hydrazine, alkyl substituted hydrazines having 1–8 carbon atoms, guanidine, biguanidine, and urea, wherein at least one of said —COM's is reacted.

GENERAL METHOD FOR THE FORMATION OF THE CHELATES

To form a metal chelate it is desirable to have it at a level of purity of course which is aimed at its end use. If the end use is agricultural certain extraneous ions will probably not be harmful. However, the preparation of a metal chelate by reaction of a water soluble salt of a heavy metal with the chelating agent will produce the metal chelate in solution, which metal chelate can, thereafter, be separated as a solid material. However, unless precautions are taken it will always be accompanied by the alkali metal salts, or the acid, formed from the reaction between the heavy metal salt and the chelating agent.

Accordingly, for the preparation of the purest grades of the heavy metal chelates it is preferable to start with the oxide or the hydroxide or the metal element as such. Thus, a solution of a salt of a heavy metal in water is alkalized with, for example, ammonia to provide a volatile base, whereupon the precipitate of hydroxide is filtered off, washed and while wet, the hydroxide precipitate is dissolved in the acid form of the chelating agent. In this form the chelate product is an aqueous solution of the heavy metal chelate. It can be evaporated to dryness to produce the pure chelate.

An alternative method of forming the heavy metal chelate is to prepare an aqueous solution of the heavy metal salt, such as nitrate or the chloride, react it with the acid form of the chelating agent, thereby to form a heavy metal chelate, evaporate to dryness, or alkalize the material with ammonium hydroxide, evaporate to dryness.

The third version or method of making the heavy metal chelate is to prepare the aqueous solution of the heavy metal salt, react it with the alkali metal salt of the chelating agent, thereby to form the chelate in solution, evaporate to dryness and generally accept the chelate with a certain amount of the salt or byproduct of reaction therein.

A quantitative method of making chelates is to prepare the solution of metal salt and literally titrate it into a solution of the chelating agent. The end point is indicated by appearance of a precipitate of the metal hydroxide. Concentrations are not critical and can be 10–50%, depending upon the solubility of the metal salt.

The hydrazides which are the chelating agents were prepared in accordance with my patent applications, Ser. No. 580,829, now Patent No. 3,351,658, issued Nov. 7, 1967, and Ser. No. 588,224, now abandoned, which are fully incorporated herein. The preparation of metal chelates is illustrated as follows:

EXAMPLE 1

Iron chelate of mono-di-tri and tetrahydrazides of ethylene diamine tetraacetic acid Samples of a mono-di-tri and tetrahydrazide of ethylene diamine tetraacetic acid, and of the disodium hydrazide, and the calcium dihydrazide were prepared in accordance with the procedures prescribed in my patent applications, Ser. Nos. 580,829 and 588,224 and the heavy metal chelates formed by these were tested under various conditions.

The iron chelates were formed as described in the general procedure, i.e., by first precipitating the ferric hydroxide from an aqueous solution of ferric chloride, washing it free of sodium chloride formed from reaction with sodium hydroxide and, thereafter dissolving the hydroxide in an aqueous solution of the hydrazide. Although the specific hydrazides prepared by the direct dehydration of hydrazine and the ethylene diamine tetraacetic acid have not given precise analytically pure products, the efficiency of the ion-chelating ability is not impared. The tetrahydrazide prepared by this method chelates ferric ion to pH 11.5 at the same weight to ferric ion ratio as the pure tetrahydrazide prepared from methyl esters.

Published literature shows that 1 gram of the commercial product EDTA will chelate 50 milligrams of ferric ion in the pH range from 9 to 10 and only 5 milligrams at pH 11.5. These were formed by titrating $Fe(NO_3)_3 \cdot 9H_2O$ 0.5 M into dihydrazide solution at 0.5 M concentration at pH 9–10–11+. On this basis the products herein are exceptionally efficient iron sources in that the following amounts of iron are chelated, or from complexes with the indicated hydrazides in the weight ratios tabulated:

|                      | Grams | Milligrams $Fe^{+3}$ at pH 11.5+ |
|----------------------|-------|----------------------------------|
| Tetra hydrazide      | 1.0   | 325                              |
| Mono hydrazide       | 1.0   | 168                              |
| Di hydrazide         | 1.0   | 168                              |
| Tri hydrazide        | 1.0   | 168                              |
| $Na_2Di$ hydrazide   | 1.0   | 140                              |

The table shows the tetrahydrazide value is high. All values are consistent with at least 1:1 chelate. That is, the factor by which an increased amount of metal is bound by the hydrazide chelating agents is so great as to suggest more than a chelation reaction involving the inner ring formation. Possibly, it is a reaction which in addition is a direct organometallic union involving more than one metal ion per mole of chelating agents.

The net valuable effect of the large capacity of the chelating agent and hence the large amount of metal chelated by the compound is that, in the application of the metal chelate itself for direct use, the enhanced effect or improved effect of the rich reservoir of metal ions is directly obtained, and directly attributable to the nature of the chelate and the fact that the metal ion is held in stable form and yet an available form, where trace metals or traces of the metal ion are neded.

The preparation of the chelates

*Chromium chelate.*—Chromic, sulphate in (10%) solution is reacted with sodium hydroxide (20%) in an equivalent amount to precipitate the chromic hydroxide. The hydroxide is filtered, washed and dissolved in aqueous solution of the acid form of the dihydrazide to form a chelate. Measurement indicates a greater than 1 to 1 molar combination.

*Nickel chelate.*—Nickel chloride is dissolved in water (10% solution) and reacted with sodium hydroxide (20%) to form nickel hydroxide which is then filtered, washed and reacted with the dihydrazide of ethylene diamine tetraacetic acid to form a chelate complex. A significantly higher than 1:1 take up of nickel is indicated.

*Cobalt chelate.*—In similar fashion cobaltous and cobaltic chlorides are reacted to form cobalt chelates of the dihydrazide with measurements indicating that the level of metal ion take up is significantly greater than with a conventional chelating agent.

*Magnesium chelate.*—Magnesium oxide in substantially pure form as an ordinary commercial chemical is reacted with the acid form of the dihydrazide to form a magnesium chelate with measurements indicating the absorption or formation of the chelate with a greater than conventional weight take up of the magnesium. Similar products can be made by using the magnesium carbonate.

*Calcium chelate.*—Calcium oxide similarly obtained as substantially pure chemical is dissolved by direct reaction in aqueous solution of the dihydrazide of the EDTA. Here also a take up of more than a 1 to 1 molar ratio of calcium ion is observed. Calcium carbonate is also useful.

*Zinc chelate.*—Zinc oxide is dissolved in aqueous solution of the acid form of the dihydrazide of the ethylene diamine tetraacetic acid. The disodium dihydrazide which is a somewhat alkaline compound is also quite useful because zinc is readily chelatable in the alkaline range. The amount of zinc taken up is indicated to be significantly greater than the conventional 1:1 chelation obtainable with ethylene diamine tetraacetic acid. While it is possible to start with the preformed relatively chemically pure commercially available zinc oxide, it is feasible to start with zinc chloride, precipitate a hydroxide and wash it clear of the sodium chloride, and proceed from there. Similarly, zinc carbonate is useful.

*Manganese chelate.*—Manganese chloride is dissolved in water, hydroxide precipitated with sodium hydroxide, filtered, and washed clear of sodium chloride and, thereafter, the hydroxide dissolved in the acid form of the hydrazide of ethylene diamine tetraacetic acid.

Lead, barium, tin, copper, manganese and other metals are similarly converted to chelate complex form by following the procedure outlined herein, using 1:1 molar ratios of metal ion to chelating agent, or greater ratios as indicated by the materials.

In illustrating the formation of the specific chelates I have used as the type compound the dihydrazide of the ethylene diamine tetraacetic acid in the acid form, simply because this is typical of the chelating agents and a convenient compound with which to work. It is one which is readily prepared by a direct dehydration and one which is more easily prepared than the tetrahydrazide.

A solution used for dissolving the oxide or hydroxide of the heavy metal can be as concentrated as the operator likes, especially since addition of the solid chelate will involve evaporation. Generally, I find 10%–20% solutions convenient and isolation of the dry chelate therefrom by evaporation easy. Similarly, any of the polyamino polycarboxylic acids may be used in the hydrazide (or hydro-nitrogen reaction product) form as reactants to form with every metal chelate complex.

The usefulness of these metal chelate complex compounds is as diverse and versatile as the compounds themselves. Generally, the usefulness is directly related to the nature of the metal which is in the compound itself and the quantity of it which is carried by the metal chelating agent.

Generally, wherever the metal chelates have found use in the arts, as reported in texts, the metal chelate complexes described herein are useful. Their usefulness is greatly enhanced by the extra metal carried by the compounds and their relative pH independence. That is, they are stable over wide pH range and hence are much more versatile than conventional chelates. Typical texts reporting uses of chelates are: Martell, Calvin, Chemistry of the Metal Chelate Compound, Prentice Hall, 1952; Chaberek, Martell, Organic Sequestering Agents, John Wily & Sons, Inc. 1959.

I have also observed an enhanced stability of the heavy metal chelate complex in solution as consequence of having in the solution a small proportion of free polyamino carboxylic acid chelating agent.

Procedure for preparation of chelating agents by direct dehydration:

Procedure A

EDTA or NTA free acid is suspended in dry toluene or xylene. Hydrazine hydrate is added to the reaction mixture. The reaction mixture is raised to reflux temperature (100–120° C.) and water is azeotroped and continuously removed. When the theoretical amount of water of reaction and excess hydrazine has been removed, the reaction mixture is cooled, the product is filtered, and vacuum dried.

Procedure B—EDTA-tetra hydrazide

EDTA 73 grams (0.25 mole), hydrazine hydrate 45 grams (1.19 moles) and 700 milliliters of toluene were placed in a reaction vessel fitted with a stirrer, thermometer, and Zarrett trap. With vigorous agitation the water was removed by azeotropic distillation at 100–200° C. After the theoretical amount of water was removed, the product was filtered and vacuum dried.

*Yield.*—78 gms. (90% of theoretical) of a white solid.

Procedure C—Monohydrazide of EDTA

EDTA 73 grams (0.25 mole), hydrazine hydrate 9.5 grams (0.5 mole) and 700 milliliters of toluene were placed in a reaction vessel fitted with a stirrer, thermometer, and Barrett trap. With vigorous agitation, the water was removed by azeotropic distillation at 100–120° C. After the theoretical amount of water was removed the product was filtered and vacuum dried.

*Yield.*—74 gms. (91.3% of theory).

Procedure D—Dihydrazide of EDTA

EDTA 73 grams (0.25 mole), hydrazine hydrate 19 grams (0.50 mole) and 700 milliliters of toluene were placed in a reaction vessel fitted with a stirrer, thermometer, and Barrett trap. With vigorous agitation the water was removed by azeotropic distillation at 100–120° C. After the theoretical amount of water was removed the product was filtered and vacuum dried.

*Yield.*—80 grams (89% of theory).

Procedure E—Trihydrazide of EDTA

EDTA 73 grams (0.25 mole), hydrazine hydrate 28.2 grams (0.75 mole) and 700 milliliters of toluene were placed in a reaction vessel fitted with a stirrer, thermometer, and Barrett trap. With vigorous agitation the water was removed by azeotropic distillation at 100–120° C. After the theoretical amount of water was removed the product was filtered and vacuum dried.

*Yield.*—83 gms. (94% of theoretical).

Direct dehydration

An aqueous solution of EDTA salt or the mixed sodium, calcium hydrazine salts are placed in the reaction vessel and the excess water plus water of hydration is removed by distillation at 100–120° C. After 90% of the theoretical water has been removed the reaction mixture becomes a viscous paste. The product is removed from the reaction vessel, placed in a thin layer in a vacuum oven and the reaction completed (six hours) at 100–105° C. under vacuum (50 mm. Hg).

Procedure E

EDTA 146 grams (0.5 mole) and $Ca(OH)_2$ or $CaCO_3$ (0.5 mole) were placed in the reaction vessel and 1.5 moles of hydrazine hydrate was added. The temperature was raised to 100° C. reflux and a clear solution was formed. After removal of 90% of the water and excess hydrazine hydrate the product was placed in a vacuum oven at 100–110° C. and the dehydration completed.

*Yield.*—172 gms. (98.3%).

Procedure F

EDTA 584 grams (2.0 moles) and NaOH (1.0 mole) were placed in the reaction vessel and 4.25 moles of hydrazine hydrate was added. The temperature was raised to 100° C. reflux and a clear solution was formed. After removal of 90% of the water and excess hydrazine hydrate the product was placed in a vacuum oven at 100–110° C. and the dehydration completed.

*Yield.*—700 gms. (96.5%)

Chelation of heavy metals

In the manner similar to that involved in the chelation of iron where the measured chelation values or complexing values have highly alkaline pH indicate an iron binding capacity 5 to 10 times as great as that obtained with ordinary conventional chelating agents such as ethylene diamine tetraacetic acid. I have found that measurements similarly carried out using chromium, nickel, lead, barium, cobalts, manganese, zinc, calcium, and magnesium and aluminum chelates give parallel results. That is, the factor by which an increased amount of metal is bound by the hydrazide chelating agents is greater than that for ordinary chelating agents by 5–10.

The chelating agents with which I form my metal complexes are quite useful for the chelation of relatively large amounts of metal and hence for the formation of an entire new class of metal chelates which have their individual special uses, because, as I perceive the mechanism, the polycarboxylic amino acid forming the fundamental building block of the chelating agent carries a plurality of carboxylic groups, each of which is reacted with a nitrogen group to form a $CONHNH_2$ moiety or $CONHNR_2$ where R is alkyl or H. With such hydro nitrogen compounds as hydrazine, guanides, amino guanidines, amino hydrazines, melamines, etc., the reaction product formed has the capacity to form a metal chelate involving the amino acid and the presence of the surplus of amino groups or hydronitrogen groups around the chelate forming portion of the molecule gives a plurality of labile hydrogens which are reactive hydro-nitrogen groups for the purpose of making, I believe, a Werner or polyamino complex with the metal which is added to the molecule. Thus, it is possible to visualize this mecanistic structure for the metal complexes and this rather direct explanation of them. That is, taking a compound like ethylene diamine tetraacetic acid, which may today be called a conventional chelating agent, the compound is considered sexadentate and the donor groups will be involved in concerted coordination of a metal. In view of the fact that its chelation capacity is thus limited to amino and acetate groups, not all of which fully satisfy the metal M, there are distinct limitations on the usefulness of such chelating compounds for forming heavy metal chelates and for their uses. This may be visualized as follows:

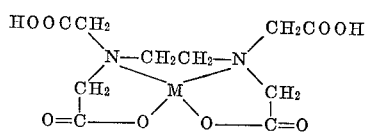

It will be observed that the compound once it has chelated a metal has very little or no additional capacity left for the reaction with the metal.

When this is compared with the chelating agent based on hydrazine as the typical product, which has a formula as follows:

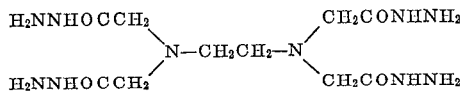

The effectiveness of the compound and the structure of the chelate are quite different matters.

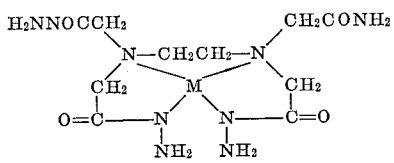

Thus, evaluation of the chelating efficiency of the ethylene diamine tetraacetic acid hydrazides with the variety of metal ions confirms the efficiency of the compounds for holding a metal in complex chelate form. The following were tested:

(1) EDTA tetrahydrazide
(2) EDTA monohydrazide
(3) EDTA dihydrazide
(4) EDTA $Na_2$-dihydrazide completely deyhdrated "solid" vacuum dried.
(5) EDTA $Na_2$-monohydrazide prepared as in 4.
(6) EDTA $Na_2$-dihydrazide from 8 dried in vacuum oven at 60° C.

These were evaluated for their chelating complexing efficiency with the metal ions $Cr^{+++}$, $Al^{+++}$, $Fe^{+++}$, $Ni^{++}$, $Zn^{++}$ and $Co^{++}$.

The hydrazides, tetra, mono, di, and disodium compounds formed with ethylene diamine tetraacetic acid chelate the iron, zinc, nickel, cobalt and aluminum very efficiently over the entire pH range. The tetrahydrazide chelation of aluminum was somewhat less efficient.

The urea products are somewhat more specific showing a high efficiency in chelating cobalt at the level 2.2 moles, nickel at the same level, and chromium at the level of 1.1 mole.

The chelation of chromium is slightly ambiguous in that it shows a specific chelation with a tetrahydraxide— sodium monohydrazide and the high temperature EDTA urea compound. It too, however, showed a large proportion of metal held per mole of chelating agent.

The chelation capacity when plotted graphically for any metal and agent is repetitive in the sense that all combinations show when the solution of a chelating agent, is titrated with the solution of the metal salt that pH's in the range of 11, 12 and 13 can be reached without precipitation of the hydroxide of the metals. This is the common or even the standard method of measuring the chelation efficiency, i.e., merely to prepare a standard solution whether there be one or two moles of the chelating agent and to titrate it with a corresponding known concentration of the heavy metal salt taking the end point at a given pH as that at which hydroxide precipitate appears.

The chelation probably takes place involving the (CON) portion of the ligand, the moiety with at least the capacity of ethylene diamine tetraacetic acid. Thus, the remaining portion of the molecule consisting of $CONHNH_2$ groups in the case of hydrazides provides a milieu in which there is labile hydrogen and highly reactive nitrogen available for reaction. Apparently this shows up for the capacity to form metal chelates involving metal ion coordination by residual donor groups derived from the original amino acid and the new —CONHR moieties containing a hydrogen that is believed to be displaced by the metal ion. Thus, complexed the metals can not be precipitated in highly alkaline solutions.

This property, of course, leads to the great effectiveness of these complexes and of the chelating agents themselves in agricultural applications.

For example for agricultural applications crude phosphate rock can be ground into a degree of fitneness of foundry sand, 60 to 100 mesh or finer, if desired, boiled with an aqueous solution of the chelating agent or merely soaked with an aqueous solution of the agent so as to place in the phosphate rock about one mol of complexing agent to one mol of calcium. Stoichiometric equivalency is not necesary, it being necessary merely to have some useful or effective amount of complexing agent present, with the result that some calcium, or other metal present, is taken up to form the complex, thereby solubilizing it and making it available to the plant and at the same time releasing phosphoric acid.

Where a mixture of metal chelates in a useful milieu is desired for agriculture it is possible to start with a material like a slag or mineral earth containing a combination of metals in the oxide, hydroxide, basic, or other form, react it with the complexing agent solution, dry and have available a mixture of metal complexes for addition to soil. That is, the metal complexes as such, individually or as mixtures are useful in agriculture as additives to soil to provide trace metals to plants.

EXAMPLE 2

Ethylene diamine tetraacetic acid tetra hydrazide

A solution of 20 grams of ethylene diamine tetraacetic acid tetramethyl ester described above and 20 milliliters of 99% hydrazine was refluxed in 100 milliliters of methanol for two hours. During this time the solution became turbid with separation of an oily phase. The mixture was concentrated to about 30 milliliters and allowed to cool overnight. The viscous gum which settled was obtained by decantation from the supernatant liquor. On trituration with ice water the gum crystallized and could then be recrystallized from water or from 50% ethanol. The white crystalline product melted at 98° to 100° C.

*Analysis.*—Calc'd (percent): C, 32.78; H, 7.15; N, 38.23. Found I (percent): C, 31.64; H, 7.42; N, 33.09. Found II (percent): C, 33.44; H, 7.22; N, 38.70.

Calculated value is based on EDTA hydrazine monohydrate $C_{10}H_{26}N_{10}O_5$, mol. wt. 366.39.

It has been established that both the ferrous and ferric ions complex with this ligand species. Though the structure of the complexes was not obtained, several important characteristics of these complexes were noted. First, both the ferrous and ferric species are exceptionally soluble in water over a wide pH range (3 to 13). It should be noted that no iron oxide precipitated from a solution of 1 gram of complex in 25 milliliters of water over the aforementioned pH range. Second, a continuous variation study involving the visible spectra of the ferric derivative uncovered an involved reaction mechanism of complexation. Immediately upon mixing the ferric ion with a ligand solution, a complex form which has a 2 to 1 stoichiometry. However, after a twenty-four hour period, there is an apparent transformation to a 1 to 1 stoichiometry.

Conductivity measurements did little to assist in the elucidation of the structures of the complexes. The molar conductances are listed in the table. There is an appreciable drop in the conductance values of the complexes as compared to the analagous metal chloride. This is contrary to the expected behavior because the ionic mobility decreases with the size of the ions and, if we assume that the molar conductance is an additive feature of the ionic conductance (Kohlrausch's law), then it is to be expected that the larger molecule would show an increase in conductance as compared to the smaller one. However, the behavior that was noted was the reverse. That is to say, there is a decrease in conductance as we go from the iron chloride to the iron complex.

TABLE

Molar conductance value of $10^{-3}$ aqueous solution of the complexes at 22.5°.

| Compound: | Molar conductance |
|---|---|
| KCl | 155 |
| $FeCl_2$ | 244 |
| $FeCl_3$ | 635 |
| $FeCl_2$+ligand | 141 |
| $FeCl_3$+ligand | 400 |

KCl is a uni-uni, $FeCl_2$ a di-uni, and $FeCl_3$ a typical tri-uni electrolyte.

Qualitatively the properties of EDTA hydrazide are that it is soluble in water and in hot ethanol, insoluble in butanol, benzene, acetone, ethyl ether, ethyl acetate and forms a deep red solution with ferric chloride, a red solution with cobalt ion, and a green yellow solution with nickel ion.

EXAMPLE 3

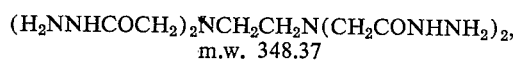
m.w. 348.37

To 502 grams (1.15 mole) EDTA tetramethylester free base was added, dropwise, with stirring, and at room temperature, 346 grams (6.9 moles, 1.5× excess) 100% hydrazine hydrate. After the mild exothermic reaction was over the mixture was stirred at about 45° for four more hours. After cooling and seeding the product was collected and washed thoroughly with methanol. Yield, 375 grams (93%); M.P. 98°. A portion was recrystallized from 90% methanol, M.P. 99–100°.

EXAMPLE 4

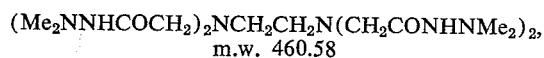
m.w. 460.58

A solution of 50 grams (0.143 mole) EDTA tetramethylester free base, 43 grams dimethyl hydrazine (0.715 mole, 1.25× excess) and 200 milliliters methanol was refluxed for four hours. The volatile liquids were eliminated at suction and the thick oil was induced to crystallize in the freezer. The very low melting crystals were collected, sucked dry and rinsed well with ether and hexane. Yield, 46 grams (70%). A sample was recrystallized from ether-hexane. M.P., 30–31°.

The EDTA hydrazide so prepared, M.P. 95–97°, was analyzed. Some difficulty is encountered in purifying it, but nitrogen analysis for the formula is $C_{10}N_{16}O_4N_6$— 33.1% found; 29.6% calculated.

It is observable that the EDTA hydrazide as the type compound forms extraordinarily stable chelates with iron. Such chelates have been formed and stored at pH 12, in solution for 12 months without precipitation. Because of the strong interaction with ferric ion, I deduce the following reaction occurs between the ferric ion and each hydrazide group in the molecule

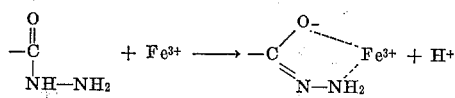

Thus the strong Fe(III) binding properties of EDTA tetrahydrazide are due to the fact that it has four such groups in the molecule as indicated by the following formula:

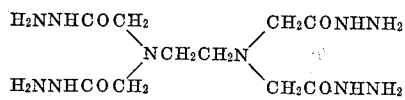

EXAMPLE 5

An aliquot amount of the mixed ester product mono-, di- and some tri-methyl ester of EDTA is reacted in methanol using excess hydrazine in form of its hydrate. There is first a heat of neutralization, sufficient to reflux the alcohol. The solution becomes reddish—probably due to trace iron contamination. It is heated to reflux and held at that temperature for a period of 1 hour. With distillation of the methanol there is left a composition the consistency of heavy glycerine. There is no crystallization when it is allowed to stand. No crystallization with chilling overnight. The composition is soluble in water to give a pH of 4 to 4.5. With addition of $FeCl_3$ it forms a reddish-purple solution. $NaCO_3$ discharges $CO_2$ and the solution becomes alkaline and the chelate is a deep purple. Caustic soda added to the solution was without effect; no precipitation of $Fe(OH)_3$. Soap is not precipitated but forms a clear foaming solution in the reddish purple solution of the complex.

EXAMPLE 6

An aliquot sample of the mixed (mono, di and tri) ester of EDTA and larger amounts of hydroxy ethyl ethylenediaminetriacetic acid is reacted with excess hydrazine as in Example 5 and concentrated; removing a major portion of the methanol and unreacted hydrazine. This solution has all the characteristics of Example 5.

EXAMPLE 7

The mixed ester (mono, di, tri) containing a major portion of diothylenetriaminepentaacetic acid is reacted in the same way as 5 and 6. The iron chelate resulting from this reaction is of less color at pH of 4 to 5 and red at pH of 10, becomes purple with time (2 weeks plus) but remains soluble.

EXAMPLE 8

The mixed ester containing a major proportion of cyclohexylene diamine tetra acetic acid is reacted as in Example 5. The obtained chelate is purple at pH 10.

EXAMPLE 9

30 grams of the mixed methyl ester of EDTA (mono, di, tri) is reacted with 10 grams of guanidine carbonate (in methanol). $CO_2$ is discharged and the at-first insoluble guanidine carbonate goes into solution as the reaction proceeds. The final reaction product is a clear solution in methanol. The excess methanol is distilled off leaving a very concentrated viscous solution. Alcohol is further allowed to evaporate; a soft white solid is left but not crystalline. It is soluble in water and alcohol; in water it has pH 6. The iron chelate is at first of a clear yellow color but becomes red on standing and deep red when alkali is added.

EXAMPLE 10

Following the procedure of Example 9, in place of guanidine, amino guanidine carbonate is added (guanyl hydrazine). After reaction as in Example 9 a more basic product is obtained. The iron chelate is highly colored at acid pH and more so at alkaline pH.

EXAMPLE 11

An aliquot amount—25 grams of the lactone-ester product is reacted with excess hydrazine in methanol. The excess methanol and hydrazine is removed by distillation. The end product is a clear resin soluble in methanol and water. The pH of water solution is about 5. The iron chelate is at first yellow to red—becomes deep red at alkaline solution. This has a peculiar action—any excess iron ions present appear to be magnetic.

Similar end products can be produced by the use of salts of the amino acids.

EXAMPLE 12

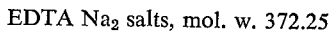

7.45 grams dry weight in 20 milliliters of water and 10 grams hydrazine hydrate (excess) are heated to reflux and immediately concentrated by means of vacuum. The residue is a white semisolid resin, soluble in water. The $Fe^3$ chelate is at first an opalescent yellow in alkaline solutions but becomes a deep purple after 3 days. There is no precipitation of $Fe^3$ hydroxide. Guanidine, etc., can be substituted for hydrazine.

EXAMPLE 13

29.5 grams (1/10 mole) of EDTA acid in water. There is now added 2/10 mole of hydrazine hydrate plus a 10% excess. This solution is refluxed for a period of 1 hour and then concentrated. Then still further concentrated by water vacuum. The resulting product is a resin. The pH is 5. $Fe^3$ forms a yellow chelate at this pH but purple at pH of 10 and above. It is very stable.

EXAMPLE 14

Using guanidine carbonate and the procedure of Example 13 a similar very stable iron chelate is formed.

EXAMPLE 15

EDTA and amino guanidine (guanyl hydrazine) and following the procedure of Example 13 a similar very stable iron chelate is formed.

EXAMPLE 16

1/10 mole of tetra methyl ester of EDTA in 100 millilieters methanol are reacted with 1/10 mole of guanidine carbonate. The carbonate is not soluble in alcohol but as reaction proceeds and $CO_2$ discharges, the reaction product is soluble in methanol. Vacuum distillation of the methanol leaves a heavy syrup which tends to crystallize (but incomplete). The iron chelate of this product is yellow but turns red after a few hours standing. It is similar to the product obtained when EDTA and guanidine carbonate are mixed and gradually heated to produce a uniform melt.

In place of EDTA other analogues of this acid can be used and in similar manner and with similar results:

EXAMPLE 17

One molar equivalent of hydroxy ethyl ethylenediamine triacetic acid is reacted in water, with 1 equivalent of guanidine carbonate—and concentrated to a clear resin. The iron chelate of this product is yellow at pH below 7.

EXAMPLE 18

With diethylenetriaminepentaacetic acid and procedure of Example 17, the results are parallel.

EXAMPLE 19

Cyclo hexyl diamino tetra acetic acid

1/10 mole of this acid is slurried in water with 1/10 mole (2 guanidine equivalents), guanidine carbonate. $CO_2$ is discharged and the whole becomes a clear solution. When concentrated a resin is obtained. The resin is soluble in water. $Fe^3$ forms a yellow chelate at pH 5, but purple red at pH 9 and above.

EXAMPLE 20

Cyclo hexyl diamino tetra acetic acid

1/10 mole is reacted in water with excess hydrozine hydrate by first refluxing this composition for a period of 1 hour and then concentrating the reaction mass. The product is a slightly yellow resin soluble in water. The pH is 4 to 5. The iron chelate is light yellow at this pH but purple at pH 10 and above.

EXAMPLE 21

NTA—nitrilo triacetic acid may be considered the lowest member of this series of amino acids. This, too, will react, for example: 1 mole equivalent in water with a slight excess of hydrazine hydrate. Then concentrating under vacuum. The product is again a noncrystallizing resin, but with all the characteristics, namely, a good, stable Fe chelate. Yellow at acid, red at alkaline pH solutions.

EXAMPLE 22

To two liters of water there are added 300 parts of, or 300 grams, of ethylenediaminotetraacetic acid (1 mol) and 200 grams of guanidine carbonate (1 mol) equivalent to 2 guanadines. Carbon dioxide is immediately given off. As the mixture is heated to completion of the evolution of carbon dioxide a clear solution is formed. This is then evaporated to about half its volume whereupon a generous yield of clear white crystals is obtained. The crystals are soluble in water to give a pH of 6.

The solution of the crystals will chelate iron at pH 6 to give a clear yellow solution. With the addition of sodium carbonate to the iron chelate solution raising the pH to a level of 10 the solution remains clear while it gradually turns red as the pH 10 is approached. With the addition of soap to this strongly alkaline iron complex solution nothing happens even upon boiling. It would appear that the chelating agent formed is a good complexing agent for iron.

The crystalline product obtained melts at 227°–229° C., no decomposition, forming a resin, water soluble, and will chelate metal ions.

What is claimed is:

1. A heavy metal chelate complex compound of a formula $$M_a \cdot X$$

wherein M is a metal of valence greater than 1, wherein $a$ is 1 to 2 inclusive, and wherein X is the reaction product of a compound having a formula given by:

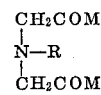

wherein,

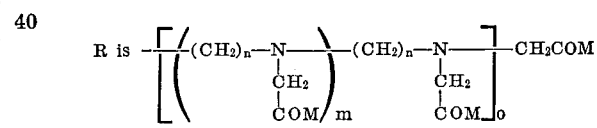

$m = 0-4$
$o = 0,1$
$n = 2,3$ and —COM is independently selected from the group consisting of COOH, —COONa, —COOK, —COONH₄, and C—O—O-alkyl, not more than two COM's being —CH₂OH, with a compound selected from the group consisting of hydrazine, alkyl substituted hydrazines having 1–8 carbon atoms, guanidine, biguanidine, and urea, wherein at least one of said —COM's is reacted to form an amide linkage.

2. A heavy metal chelate complex composition in accordance with claim 1 of a metal selected from the group consisting of iron, chormium, nickel, cobalt, copper, zinc manganese, calcium, magnesium, barium, lead and aluminum.

3. A heavy metal complex in accordance with claim 1 comprising the iron complex of the reaction product of ethylene diamine tetraacetic acid and hydrazine in a ratio of more than one mole of iron per mole of the chelating agent.

4. A heavy metal complex in accordance with claim 1 comprising the nickel complex of the reaction product of ethylene diamine tetraacetic acid and hydrazine in a ratio of more than one mole of nickel per mole of the chelating agent.

5. A heavy metal complex in accordance with claim 1 comprising the copper complex of the reaction product of ethylene diamine tetraacetic acid and hydrazine in a ratio of more than one mole of copper per mole of the chelating agent.

6. A heavy metal complex in accordance with claim 1 comprising the zinc complex of the reaction product of ethylene diamine tetraacetic acid and hydrazine in a ratio of more than one mole of zinc per mole of the chelating agent.

7. A heavy metal complex in accordance with claim 1 comprising the zinc complex of the reaction product of ethylene diamine tetraacetic acid and hydrazine in a ratio of more than one mole of zinc per mole of the chelating agent.

8. A heavy metal complex in accordance with claim 1 comprising the lead complex of the reaction product of ethylene diamine tetraacetic acid and hydrazine in a ratio of more than one mole of lead per mole of the chelating agent.

References Cited

UNITED STATES PATENTS

| 2,742,498 | 4/1956  | Smith et al. | 260—518 |
| 3,272,738 | 11/1966 | Pitzer et al. | 210—51 |
| 3,297,580 | 1/1967  | Pitzer | 252—142 |
| 3,351,658 | 11/1967 | Bersworth | 260—534 |

FOREIGN PATENTS 781,491   8/1957   Great Britain.

TOBIAS E. LEVOW, Primary Examiner

A. P. DEMERS, Assistant Examiner

U.S. Cl. X.R.

260—429.9, 435, 438.1, 438.5, 439, 448, 534

PO-1050
(5/69)

UNITED STATES PATENT OFFICE
CERTIFICATE OF CORRECTION

Patent No. __3,507,892__      Dated __April 21, 1970__

Inventor(s) __Frederick C. Bersworth__

It is certified that error appears in the above-identified patent and that said Letters Patent are hereby corrected as shown below:

Column 13, cancel lines 8 to 12, inclusive, and insert the following:

-- 7. A heavy metal complex in accordance with Claim 1 comprising the manganese complex of the reaction product of ethylene diamine tetraacetic acid and hydrazine in a ratio of more than one mole of manganese per mole of the chelating agent. --

Signed and sealed this 14th day of March 1972.

(SEAL)
Attest:

EDWARD M. FLETCHER, JR.
Attesting Officer

ROBERT GOTTSCHALK
Commissioner of Patents